United States Patent
Menzel

(10) Patent No.: US 10,921,762 B2
(45) Date of Patent: Feb. 16, 2021

(54) ENERGY MANAGEMENT SYSTEM AND METHOD

(71) Applicant: SCHNEIDER ELECTRIC USA, INC., Andover, MA (US)

(72) Inventor: Johannes Menzel, Saint Hilaire du Trouvet (FR)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 16/158,704

(22) Filed: Oct. 12, 2018

(65) Prior Publication Data

US 2019/0212711 A1 Jul. 11, 2019

Related U.S. Application Data

(63) Continuation of application No. 15/091,391, filed on Apr. 5, 2016, now Pat. No. 10,120,353.

(51) Int. Cl.
| | |
|---|---|
| *G05B 15/02* | (2006.01) |
| *G06F 1/26* | (2006.01) |
| *G06Q 10/00* | (2012.01) |
| *G06Q 50/06* | (2012.01) |

(52) U.S. Cl.
CPC ............. *G05B 15/02* (2013.01); *G06F 1/266* (2013.01); *G06Q 10/00* (2013.01); *G06Q 50/06* (2013.01)

(58) Field of Classification Search
CPC ........ G05B 15/02; G06F 1/266; G06Q 10/00; G06Q 50/06
USPC ................................................. 700/291, 293
See application file for complete search history.

(56) References Cited

U.S. PATENT DOCUMENTS

| | | | |
|---|---|---|---|
| 8,756,024 B2 | 6/2014 | Hedley et al. | |
| 10,120,353 B2 * | 11/2018 | Menzel | ................... G05B 15/02 |
| 10,168,677 B2 * | 1/2019 | Funes | ................. H04L 12/2834 |
| 2004/0102937 A1 | 5/2004 | Ibrahim | |
| 2009/0070168 A1 | 3/2009 | Thompson et al. | |
| 2009/0259346 A1 | 10/2009 | Reed et al. | |
| 2009/0307573 A1 | 12/2009 | Lavelle et al. | |
| 2010/0100253 A1 | 4/2010 | Fausak et al. | |
| 2011/0231320 A1 | 9/2011 | Irving | |
| 2012/0022700 A1 | 1/2012 | Drees et al. | |
| 2013/0184885 A1 | 7/2013 | Keil et al. | |
| 2013/0289904 A1 | 10/2013 | Marwah et al. | |
| 2014/0058572 A1 | 2/2014 | Stein et al. | |

(Continued)

OTHER PUBLICATIONS

Aman, et al. "Energy Management Systems: State of the Art and Emerging Trends" IEEE Communications Magazine. Jan. 2013.

(Continued)

*Primary Examiner* — Chun Cao
(74) *Attorney, Agent, or Firm* — Lando & Anastasi, LLP

(57) ABSTRACT

A method for energy management include steps of collecting data during a period of time, identifying data clusters within the data, categorizing the data clusters in the period of time, analyzing the data clusters, and assigning a classification to the period of time. Real time data can be compared to scheduled performance. Real time notifications can be provided to a user where energy is being used inefficiently. Energy efficiency of meters within a site can be ranked to identify meters where energy is being used inefficiently. A system is also provided for performing the method of the present disclosure.

20 Claims, 16 Drawing Sheets

(56) References Cited

U.S. PATENT DOCUMENTS

2016/0202681 A1* 7/2016 Keil .................. F24F 11/62
   700/295
2017/0032476 A1* 2/2017 Keil .................. F24F 11/62

OTHER PUBLICATIONS

Extended European Search Report from corresponding European Application No. 17164392.7 dated May 4, 2017.

* cited by examiner

ENERGY MANAGEMENT SYSTEM AND METHOD

CROSS-REFERENCE TO RELATED APPLICATION

This application is a continuation of U.S. patent application Ser. No. 15/091,391 entitled "ENERGY MANAGEMENT SYSTEM AND METHOD," filed on Apr. 5, 2016, which is herein incorporated by reference in its entirety.

FIELD OF INVENTION

Aspects and embodiments of the present disclosure are directed generally to the evaluation of energy management within any building or process, such as any commercial, industrial or institutional facility.

BACKGROUND OF THE DISCLOSURE

Current energy consumption analysis focuses on daily values such as measured consumption values for a day, such as a sum, a maximum value, a minimum value, a mean value, or a median value. The minimum value is sometimes wrongly called a base load, and is better referred to as a constant 24-hour value, because it is a minimum that is also a constant part of daily energy consumption. The maximum value impacts the yearly costs of energy usage. The sum or mean (and less frequently the median) are used for calculations, such as in reports that aggregate usage of meters or main meters per day.

The minimum and maximum energy consumption values for a day provide information about extreme values, rather than the intervals of different levels of energy consumption throughout a given day. Similarly, the sum, mean and median values are aggregated values, and as such do not contain detailed information about intervals of different levels of energy consumption throughout a given day.

SUMMARY OF THE DISCLOSURE

In one aspect of the present disclosure, a method for energy management includes collecting energy consumption data for a site during a period of time using one or more energy consumption meters; identifying data clusters within the energy consumption data, the data clusters indicating a status of energy consumption at the site; categorizing the data clusters in the period of time; analyzing the data clusters; and assigning one of a plurality of energy consumption classifications to the period of time.

In some embodiments, the period of time is classified as an open day, a 24-hour open day, or a 24-hour closed day.

In some embodiments, the method includes identifying the period of time as being a normal period of time or an abnormal period of time, with respect to an actual energy consumption during the period of time.

In some embodiments, the method includes controlling at least one device to manage the energy consumption in response to an identification of an abnormal time period.

In some embodiments, the method includes providing at least one recommendation to a user to improve energy consumption efficiency for the site.

In some embodiments, the method includes providing a desired energy usage and a desired classification for the period of time; comparing actual energy usage to the desired energy usage; and comparing the energy consumption classification assigned to the period of time with the desired classification.

In some embodiments, the method includes performing a self-learning and continuously self-adapting process for learning a normal energy consumption pattern for the site.

In some embodiments, the method includes providing a plurality of meters; analyzing the data collected from each meter; ranking the meters according to energy management efficiency; and notifying a user of the meter ranking.

In some embodiments, the method includes identifying a first data cluster corresponding to normal running hours; identifying a second data cluster corresponding to normal closed hours; calculating a first mean energy consumption value for the first data cluster and a second mean energy consumption value for the second data cluster; and calculating a ratio of the first mean energy consumption value to the second mean energy consumption value.

In some embodiments, the method includes notifying a user if the ratio of the first mean energy consumption value to the second mean energy consumption value is below a critical ratio value.

In some embodiments, the method includes identifying a data cluster corresponding to energy consumption transitioning between normal running hours and normal closed hours; calculating a slope of the data cluster; and notifying a user if the slope is below a critical slope.

In another aspect of the present disclosure, a system for energy management includes at least one energy consumption meter; a controller having a processor and a memory component. The controller is in communication with the at least one energy consumption meter. The processor is configured to collect energy consumption data for a site during a period of time using the at least one energy consumption meter; identify data clusters within the energy consumption data, the data clusters indicating a status of energy consumption at the site; categorize the data clusters in the period of time; analyze the data clusters; and assign one of a plurality of energy consumption classifications to the period of time.

In some embodiments of the system, the processor is further configured to classify a period of time as an open day, a 24-hour open day, or a 24-hour closed day.

In some embodiments of the system, the processor is configured to identify the period of time as being a normal period of time or an abnormal period of time, with respect to an actual energy consumption during the period of time.

In some embodiments of the system, the processor is further configured to control at least one device to manage the energy consumption in real time in response to an identification of an abnormal time period.

In some embodiments of the system, the processor is further configured to provide a recommendation to a user to improve energy consumption efficiency for the site.

In some embodiments of the system, the processor is further configured to provide a desired energy usage and a desired classification for the period of time; compare actual energy usage to the desired energy usage; and compare the energy consumption classification assigned to the period of time with the desired classification.

In some embodiments of the system, the processor is further configured to perform a self-learning process for learning a normal energy consumption pattern for the site.

In some embodiments of the system, the processor is configured to analyze the respective data collected from each meter; rank the meters according to energy efficiency; and notify a user of the meter ranking.

In some embodiments of the system, the processor is configured to identify a first data cluster corresponding to normal running hours; identify a second data cluster corresponding to normal closed hours; calculate a first mean energy consumption value for the first data cluster and a second mean energy consumption value for the second data cluster; and calculate a ratio of the first mean energy consumption value to the second mean energy consumption value.

In some embodiments of the system, the processor is further configured to identify an energy consumption meter that is a main contributor to an abnormal energy consumption.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
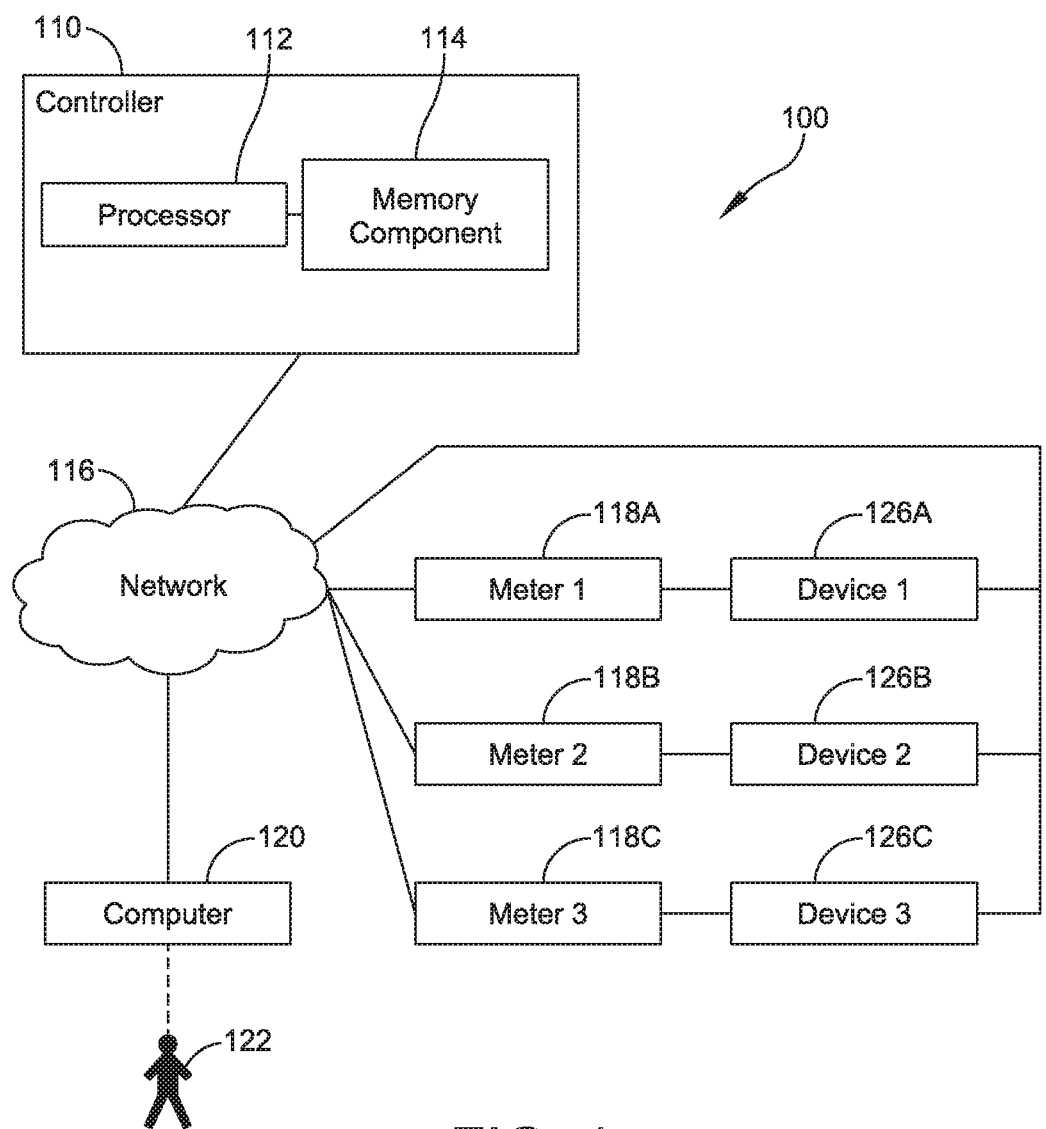
FIG. 1 is a schematic diagram of one embodiment of a system of the present disclosure.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The present disclosure relates generally to analyzing energy consumption data of a site and taking action to increase the energy efficiency of that site.

There is a need to provide accurate, real time and/or historical energy consumption data that is localized to a facility, a building in a facility, a floor within a building, and/or another metered site. The present disclosure provides a method and system for detecting and alerting whether a device or an appliance, such as a heating, ventilating, and air conditioning (HVAC) system was left running when it should have been off. The present disclosure also provides a method and system for identifying whether there were factors that caused abnormal energy consumption on a given day. The present disclosure provides a method and system that are useful for providing actionable recommendations to a user to increase energy consumption efficiency. In an embodiment, the method and system include a plurality of meters in a site that allow a user to see which metered device or set of devices is in need of energy efficiency improvement or corrective action. The present disclosure provides a method to dynamically model the normal energy consumption (or power consumption) behavior of a process or of a building or of one of their specific components (for example, a light on a specific floor which follows external daylight hours changes over the year).

The method of the present disclosure can be implemented on a system of components (such as energy meters) connected over a network. In FIG. 1, a controller 110 includes a processor 112 and a memory component 114, and the processor 112 is configured for performing one or more of the processes described herein. The controller 110 is connected to a network 116. Energy usage meters 118A, 118B, 118C are in communication with the network, and can communicate with the controller 110 through the network 116. More or fewer than three energy usage meters may be provided in some embodiments. The energy usage meters 118A, 118B, 118C collect energy usage data for a site (e.g. each collects energy usage data from a respective device 126A, 126B, 126C located in a site) and transmit the data to the controller 110 through the network. The devices 126A, 126B, 126C can be in communication with the controller 110 through the network 116 and can be controlled by one or more signals transmitted from the controller 110. A computer or another electronic device 120 can be in communication with the network and has a user interface that allows a user 122 to view information provided by the processes of the method of the present disclosure. A controller 124 is connected to the network 116. As shown, the controller includes a processor 112 and a memory component 114. To manage energy consumption of devices 126A, 126B,126C, the computer 120 includes a user interface that allows a user to send commands to the controller to affect the operation of these devices (e.g. shut them off, decrease their energy consumption, etc.). In some embodiments based on data received and analyzed, the controller may take action to control one or more devices.

Another embodiment may be set up based on utility interval data measurements which can be used as an input to the system. This may be achieved manually (with a CSV (comma separated values) file, for example), or via a cloud computing connection, or automatically (if connected to the utility).

Another embodiment may be to deploy the system in addition or as a meta controller, by connecting into any existing energy measurement system (such as an existing building management system).

A system of the present disclosure automates the interpretation of energy consumption data by assigning clusters of energy consumption data to one of several daily profile elements, and then classifying the facility daily operating mode based on the combination of profile elements present. This system learns the current daily operating mode over a baseline period (such as a 2-week period) and can generate notifications when something changes (such as different start/stop times for a set of profile elements within a day, or a different facility operating mode than expected on a weekend). Then the system dynamically (such as daily or with every new data point, or any other relevant time of refresh) updates the model, detecting and adapting its reference to the new data received, and thus is able to detect any new behavior. The model constantly learns and adapts itself. New profiles may become the new normal reference for any given day or time period. Seasonal energy consumption profiles (seasonalities) are thus reflected in the model on a continuous mode. All changes will thus be detected and trigger analysis to define if they are out of bound (abnormal) and if they require an alert to be triggered, or if they are "best in class".

Figure 2:
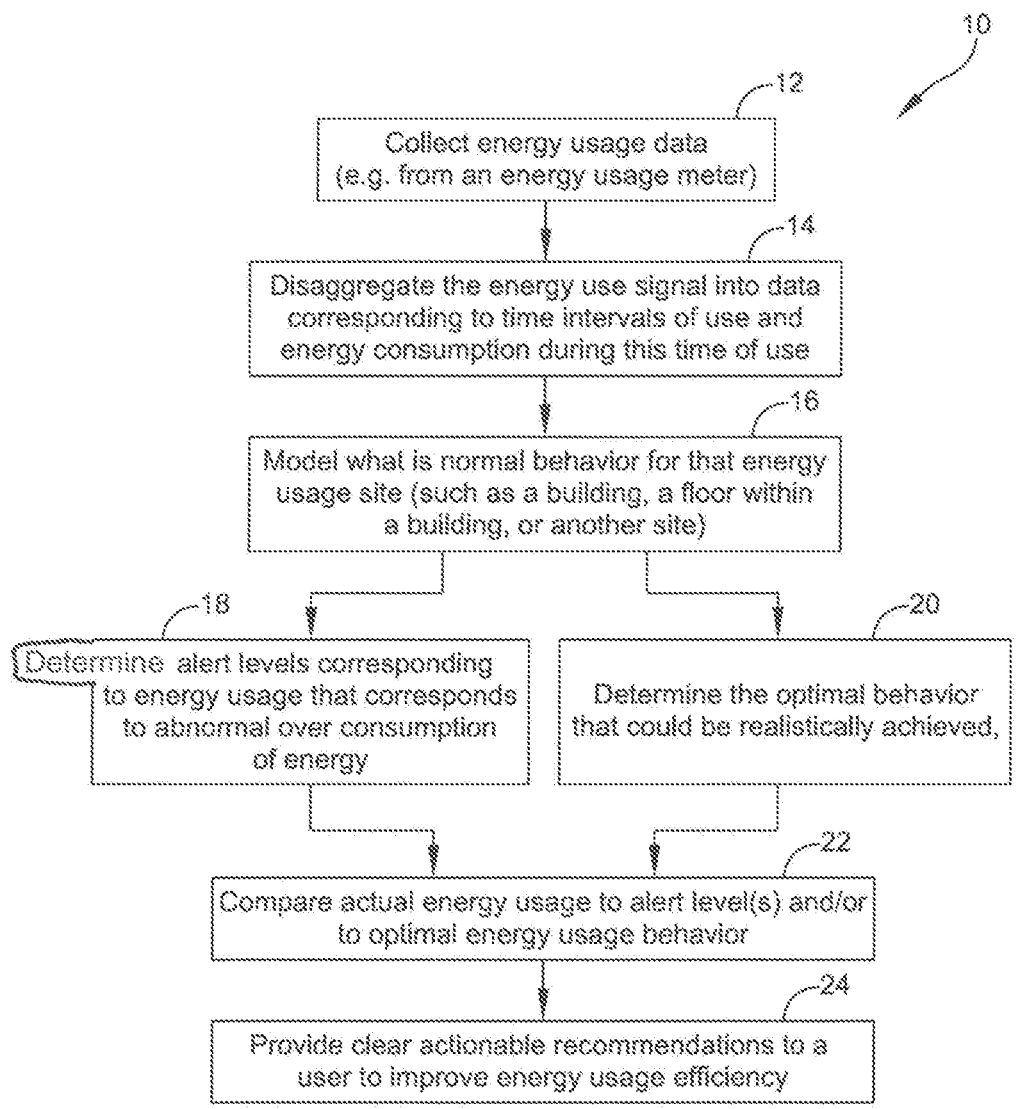
FIG. 2 is a flowchart of an embodiment of a method of the present disclosure.

FIG. 2 provides a flow diagram of one embodiment of a method 10 of the present disclosure that can be performed by the system of the present disclosure. Energy consumption data is collected at Block 12, for example from one or more energy usage meters 118A, 118B, 118C. An energy usage meter can be for an entire facility, a building in a facility, a floor in a facility, or another metered region. It can be dedicated to a specific type of usage, such as HVAC or lighting, or it may be a mix of usages. Preferably there is a plurality of meters 118A, 118B, 118C within a facility, with each meter measuring energy consumption in a respective metered region of the facility or measuring energy consumption for a respective type of usage. The energy consumption data is transmitted via a wired or wireless network 116 coupled to the controller 110. At Block 14, the energy use signal is disaggregated into data corresponding to daily time intervals of use and energy consumption during this time of use. This provides energy usage information at discrete intervals throughout the day, rather than a mean or median value of energy usage for that given day. The energy usage data shows energy usage during running hours and/or during shutdown hours during a given day, and over a series of days, weeks, or another time period.

At Block 16 normal behavior for that energy usage site (such as a building, a floor within a building, another site) is modeled by the system. Once the normal behavior for that energy usage site is known, the system at Block 18 sets alert levels corresponding to energy usage that corresponds to abnormal over consumption of energy. The system can alternatively, or additionally, determine the optimal behavior that could be realistically achieved, according to measured best days for that energy usage site or to best practices in the industry or other relevant standards at Block 20. The actual energy consumption is compared with the alert levels and/or the optimal energy usage behavior at block 22. At Block 24, the system provides clear actionable recommendations to a user to improve energy usage efficiency. If the system detects longer open hours, the system informs a user to check whether this is due to unusual working schedules or events (e.g. stocking, refilling, or maintenance operations), and/or informs a user to check whether this is due to a change of process that is not wanted (e.g. wrong changes to settings, maintenance did not restart automation and left a device "forced on"). If the system detects higher consumption during open hours, the system checks whether the temperature set point has been changed, the system checks if an HVAC unit has performance issues, etc. In addition, in some embodiments, the controller can control one of the devices or another device to alter the energy usage of the site.

In one embodiment, at Block 14 each time period is divided into groups of meaningful data points using automatic profile recognition.

Figure 3:
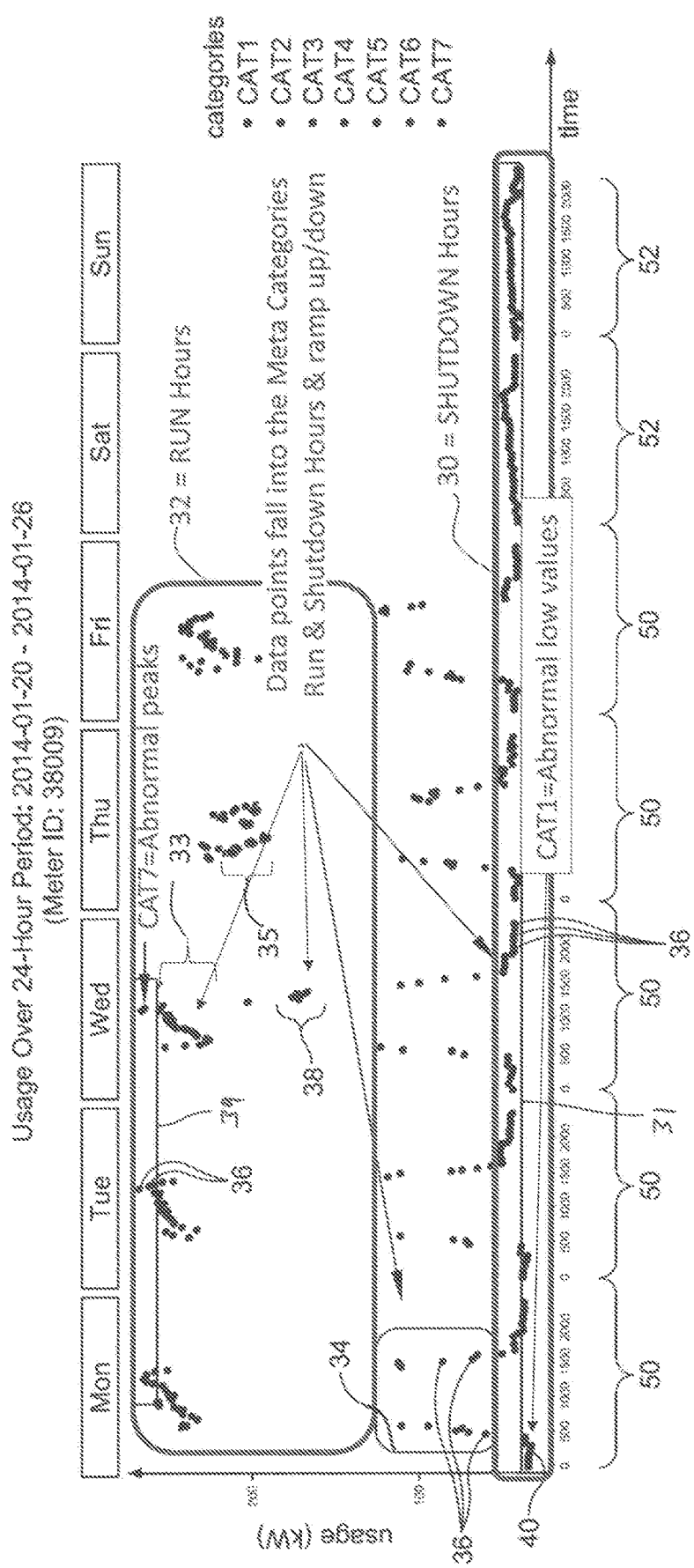
FIG. 3 is a chart showing energy usage over time for a week at a site.

Each day can be sliced into two or three (or more) meta-operating modes 30, 32, 34. FIG. 3 shows energy consumption data for a one week period running from Monday through Sunday at a site. Each data point 36 represents energy usage at a site at a given time. The site may be a building, a floor within a building, a room within a floor, or another site where energy is being consumed. A base load period can be classified as a "full off" mode (or "full off" meta category) 30. The full-off mode does not necessarily mean that all devices in the facility are shut off, but rather the full-off mode serves as a baseline standard of energy consumption at the site during times such as weekend days or all nights in an office building, or on holidays when an industrial facility is closed, or on bank holidays. A second classification is a "full on" mode 32, which corresponds to when a building or facility is fully running. The hours of the "full on" mode 32 are hours when occupants are present, visitors are coming and going, typical office hours, or students are present on campus. A third classification is a "ramp up or down" mode 34, which corresponds to a period such as when users are not yet present but heating or cooling has started to get to expected comfort level (ramp up period), or when heating or cooling is shut off or when users are leaving and shutting off lights (ramp down period). FIG. 3 shows a plurality of energy usage data points 36 in each of these meta-categories (or modes) 30, 32, 34.

The energy usage data points 36 are collected at regular intervals, which may be set according to user preferences or system capabilities. The time intervals at which the data points 36 are collected are sufficiently small that the behavior of the energy usage at the site is captured by the plot of FIG. 3. In one embodiment, the energy usage data is collected at regular intervals in some embodiments, or may be collected as real time continuous data in other embodiments. In some embodiments, the energy usage data is recorded at 1 minute intervals, 6 minute intervals, 10 minute intervals, 15 minute intervals, 30 minute intervals, or any other time intervals defined for the site.

In the system, each daily data value 36 is assigned to a defined meta operating mode 30, 32, 34. Thus, a data value can belong to the "full on" mode 32, the "full off" mode 30, or the "ramp up/down" mode 34.

In one embodiment, the system creates seven categories that are meaningful in terms of energy usage management to compare each day with other days, and to provide automatic recommendations in case of abnormal energy usage behavior or when potential energy savings or best practices may be applied. These categories are the basis for creating the meta categories. These categories enable the system to determine what are normal and abnormal values for each meta category. For example, the Category 7 shows us the data points which are abnormally high (peaks) for that specific site and meter, and for that specific period season and day of week.

Figure 3A:
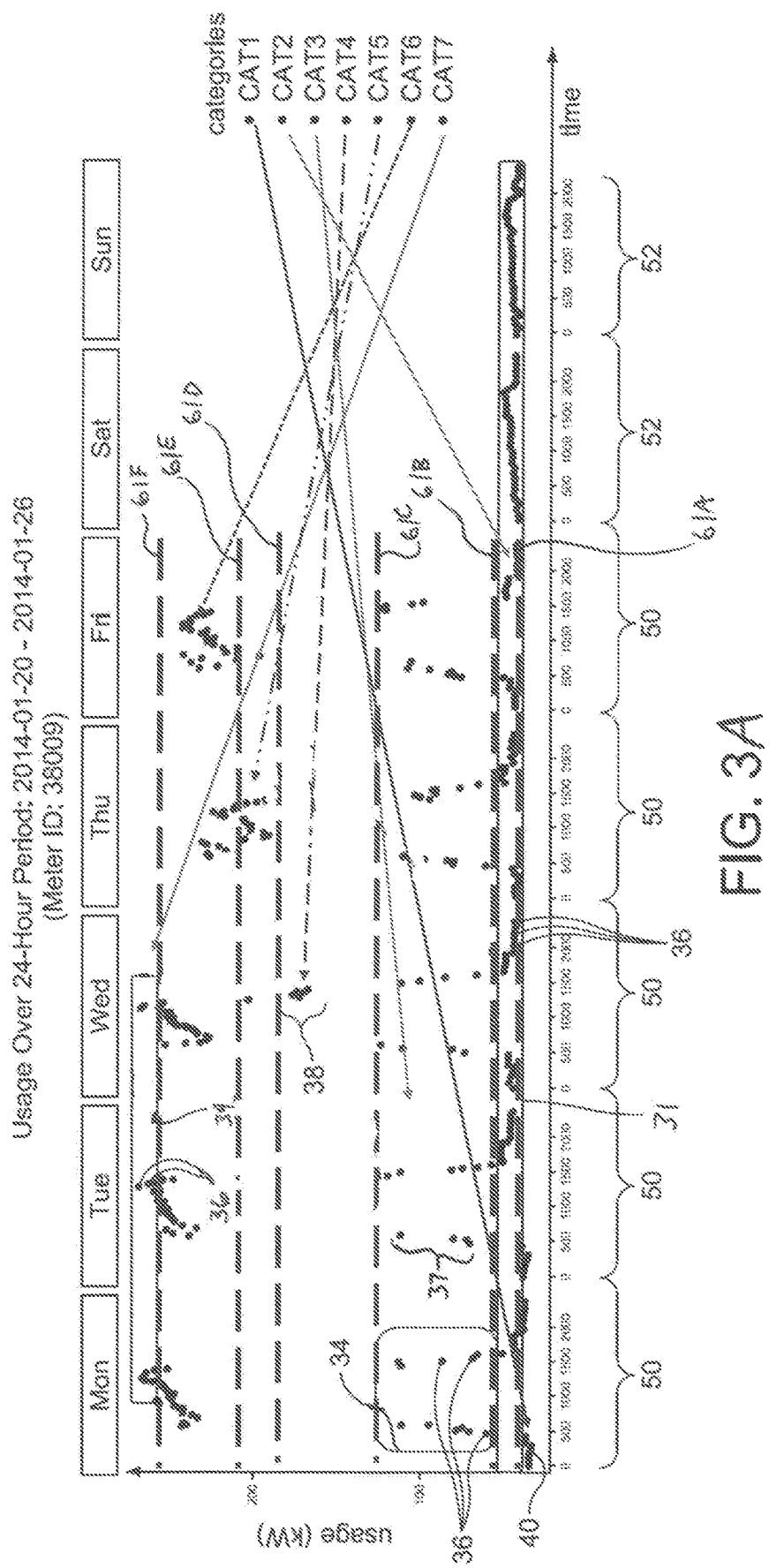
FIG. 3A is a chart showing energy usage over time for a week at a site, with horizontal broken lines showing sample thresholds for defining categories of data points.

FIG. 3 shows seven categories that are components of the meta categories 30, 32, 34. Each category is automatically calculated for each day. These categories are bins of values on the energy consumption axis ("usage" may be mean or sum for each data interval, may be kW or kWh). FIG. 3A shows example thresholds 61A, 61B, 61C, 61D, 61E, 61F. These six thresholds separate the seven categories. Category 1 has a threshold 61A above which a data point would be classified into category 2 (CAT 2). Each of categories 2, 3, 4, 5 and 6 have upper and lower thresholds. Category 7 (CAT 7) is defined for all data points above the category 6 upper threshold 61F. These categories are adapted each time the model is updated (such as daily or real time at each new reading/measurement), so as to adapt to slow changes or to detect abrupt changes. Category 1 spans a power consumption range that includes the cluster 40 of data points 36 in FIG. 3. Category 1 includes the abnormally low power consumption values in a given day. Category 2 spans a power consumption range that includes the clusters 31 of data points 36 in FIG. 3. Category 2 includes normal "full off" power consumption data points. Category 1 and Category 2 are the categories of data points 36 that make up the shutdown hours 30 meta category.

Category 3 spans a power consumption range that includes cluster 37 of data points 36 in FIG. 3. Category 3 is the category of data points 36 that make up the ramp up/down 34 meta category.

Category 4, Category 5, Category 6, and Category 7 make up the running hours 32 meta category in a given day. Category 4 includes the cluster 38 of data points 36. Category 5 includes the cluster 35 of data points. Category 6 includes the cluster 33 of data points. The threshold line 61E separates Category 5 from Category 6. Category 7 spans a power consumption range that includes the clusters 39 of data points 36 in FIG. 3. Category 7 includes the abnormally high (abnormal peak) energy consumption values in a given day.

In one embodiment, the system assigns the categories to clusters of power consumption data points 36 based on the energy consumption profile for that site. Category 4 is an in between category of data points 36 that could be assigned to the ramp up/down 34 meta category in some cases. For example, if there are two distinct operating modes within the ramp up or ramp down data points, it is useful to use both Category 3 and Category 4 to represent data points 36 in the ramp up/down 34 meta category. Category 4 is a flexible or "floating" category that can be linked to either the running hours 32 meta category or the ramp up/down 34 meta category, as needed. For example, Category 4 could correspond to a pre-heating mode or pre-cooling mode at 50% of peak load for three hours at the end of every night. Where Category 4 is included in the ramp up/down 34 meta category with Category 3, the running hours ("full on") 32 meta category includes only Category 5, Category 6, and Category 7.

Figure 7:
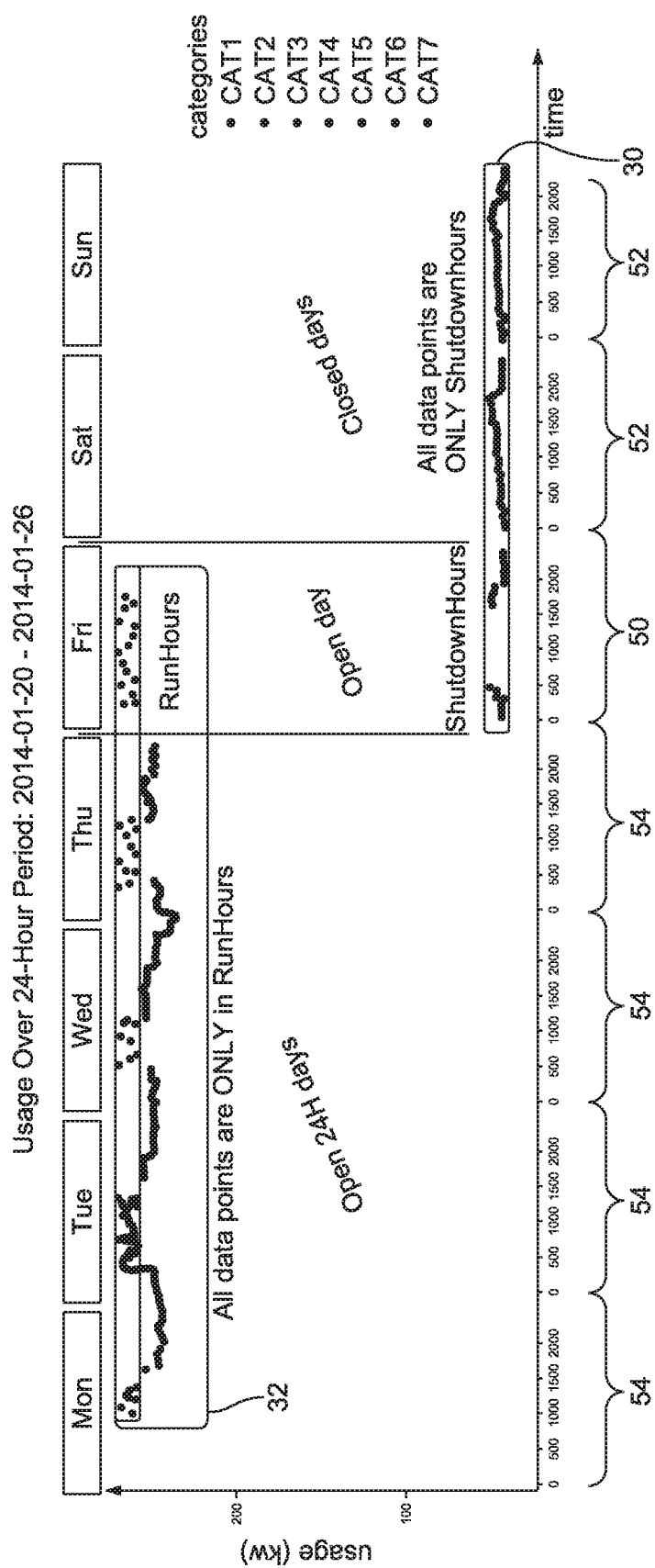
FIG. 7 is a chart showing energy usage over time.

In the method 10 that can be performed by the system, typical energy usage profiles are identified. First, there are open days, which normally exhibit a mix of the three types of running modes: "full on" mode 32, "full off" mode 30, and "ramp up/down" mode 34, as shown in FIG. 3. For example, at an office, weekly working days are open days 50. Second, there are 24-hour closed days 52, on which there is only the "full off" mode 30 (possibly with some outliers in the "ramp up/down" mode 34). For example, a holiday when the whole facility is shut down for two weeks is a set of 24-hour closed days. Third, there are 24-hour open days 54, as shown in FIG. 7, on which there is only the "full on" mode (possibly with some outliers in the "ramp up/down" mode on Monday through Thursday. For example, a data center facility on a campus typically exhibits 24-open days. In FIG. 3, each of the days Monday through Friday is labeled as an open day 50, while Saturday and Sunday are each labeled as 24-hour closed days 52.

At least some of the methods and systems of the present disclosure run in real time. The method and system can automatically categorize each data point into a category, and classify each day of operation of a facility into one of the above day classifications 50, 52, 54. That is, each day can be classified as an "open day" 50, a "24-hour open day" 54, or a "24-hour closed day" 52 in real time.

Figure 4:
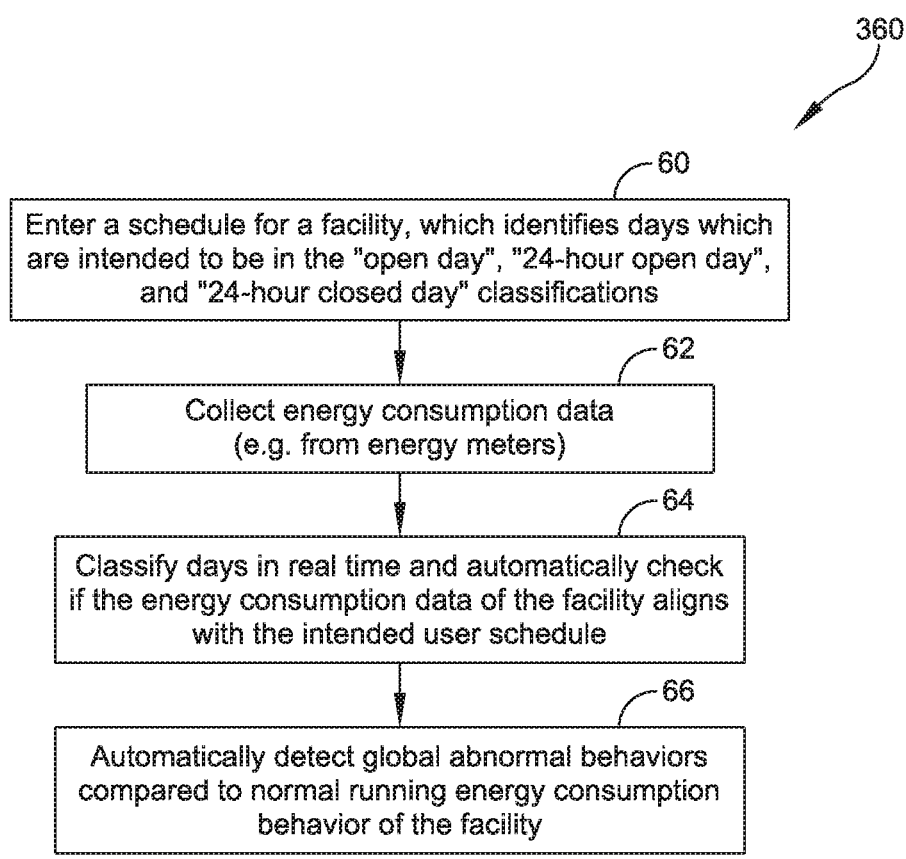
FIG. 4 is a flowchart of a process of an embodiment of a method of the present disclosure to illustrate the detection of a unexpected global behavior (normally "closed day" is "open")

In one embodiment, an automatic schedule comparison tool is implemented by the controller. A flow process diagram 360 demonstrating the operation of the tool is shown in FIG. 4. Using the tool, a user enters a schedule for a facility, which identifies days which are intended to be in the "open day," 24-hour open day," and "24-hour closed day" classifications at Block 60 in FIG. 4. It also determines how much time should be spent in "turned off" mode. The system collects energy consumption data, for example from energy consumption meters, at Block 62. The step of collection can include uploading the energy consumption data. The tool then classifies the day in real time and automatically checks if the energy consumption data of the facility aligns with the intended user schedule at Block 64. The method automatically detects global abnormal behaviors compared to normal running energy consumption behavior of the facility at Block 66. This can be based on the normal energy usage model produced by Block 16 of FIG. 2. For example, the method detects if the site is not turned "off" during what was intended to be a "24-hour closed day."

Figure 5:
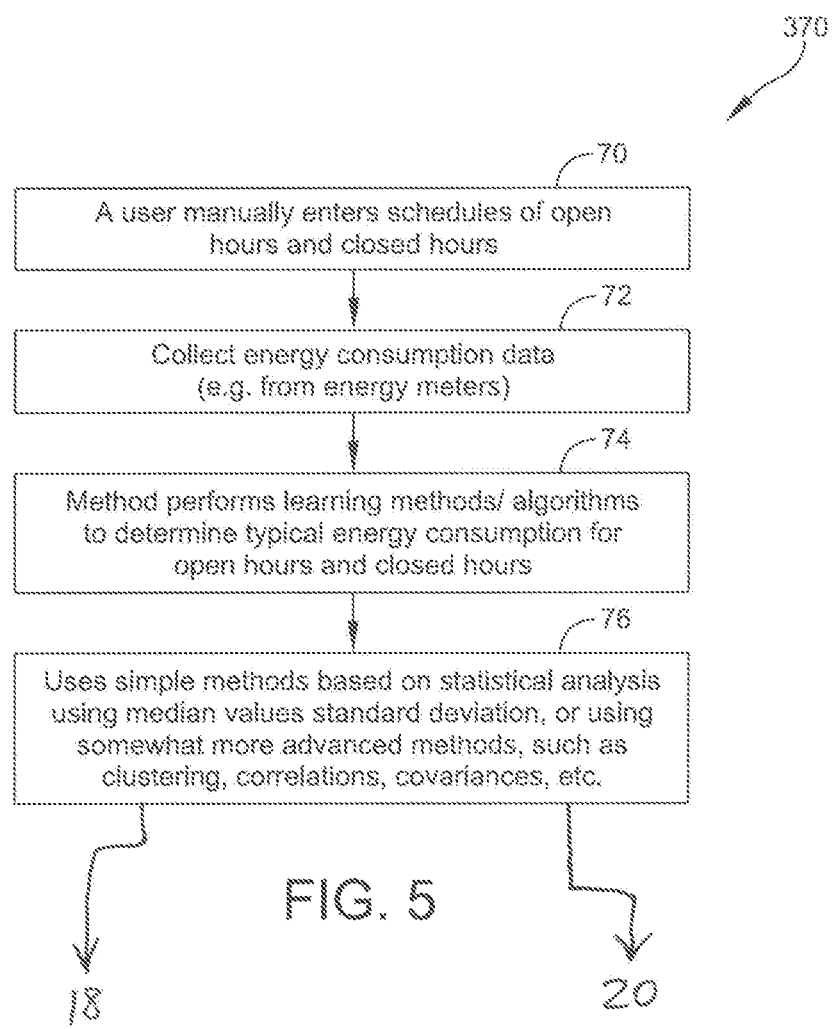
FIG. 5 is a flowchart of another process of an embodiment of a method of the present disclosure to illustrate one possible alternative to steps 12 to 16 (using manual schedule as an input to any learning method or algorithm)

FIG. 5 shows an alternate process 370 for assigning all the data points to a category. This is an alternative to Blocks 12, 14 and 16. Blocks 70, 72, and 74 represent an alternative to Block 12 and 14. Block 76 is an alternative to block 16. In some embodiments, the system uses manually entered schedules of open hours and closed hours at Block 70 in FIG. 5 as an input for supervised learning methods or processes at Block 74. The system determines typical energy consumption for open hours and closed hours based on Block 74 and the energy consumption data collected from energy meters at Block 72. The method identifies what are real running hours vs. scheduled open hours.

At Block 76, the system uses simple methods based on statistical analysis using median values and standard deviation, or using somewhat more advanced methods, such as clustering, correlations, covariances, etc. In this way, the method identifies the three major operating modes, called meta-categories discussed above: running hours ("full on"

mode) 32, closed hours ("full off" mode) 30, and the in-between values of "ramp up/down" mode 34.

The system uses the statistical analysis of Block 76 as an input for statistical analysis methods based on quartile or decile groupings of data, for example. Using statistical analysis, the system determines upper and lower clusters of energy usage data points based on minimum and maximum energy consumption values as a starting point. Then the system groups the data into decile categories. The system groups the lower three deciles into one group and the upper three deciles into another group, for example. Then the system analyzes the signal and disaggregates operating modes.

This is not a limitative list of methods/solutions. These examples are given as illustrations to show that in each case the method is directed at the same goal of disaggregating the energy consumption signal between open hours and closed hours and ramp up or ramp down categories.

FIG. 5 shows an alternate way to assign each data point to a category. The minimum (Min) value can be used to build a "tunnel" or band above this min value to try to mechanically and statistically emulate clustering to create the equivalent of Category 1 and Category 2, which are in the shutdown hours meta category.

Alternatively, signal processing, time series analytics, and feature extractions can be used to define a series of data points that are flat, data points that are lowest, data points that represent a peak, and a series of data points that represent ramp up or ramp down periods, and can be used to determine an angle of a series of data points.

Figure 6:
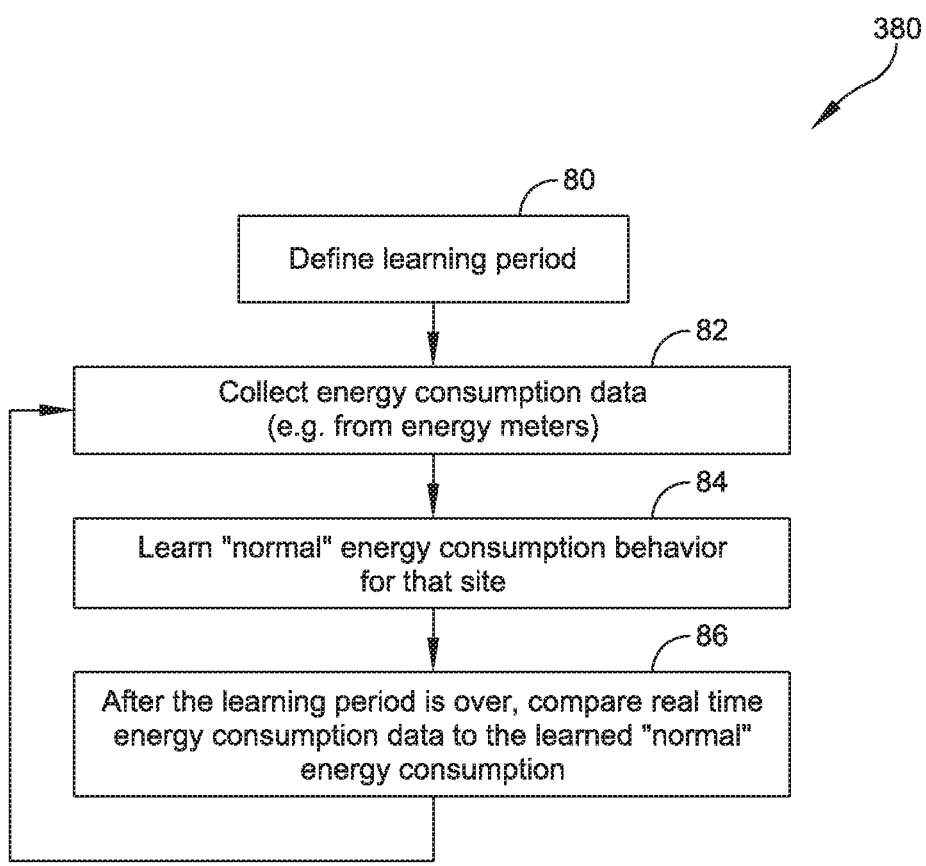
FIG. 6 is a flowchart of another process of an embodiment of a method of the present disclosure to illustrate the dynamic modeling (with a feedback loop showing the daily or real time update of the model)

In another aspect of the present disclosure, one embodiment of the method and system include an automatic self-learning and self-adjusting mechanism to adapt to changes. FIG. 6 shows a self-learning or self-adjusting process 380, in which a user defines a learning period at Block 80; the system collects energy consumption data (for example, from energy meters) at Block 82; the system learns "normal" energy consumption behavior for that metered site at Block 84; and, after the learning period is over, the system compares the real time energy consumption data to the learned "normal" energy consumption behavior for that metered site at Block 86. In some embodiments, the self-learning process of FIG. 6 is useful for creating the model at Block 16 of FIG. 2. The feedback of FIG. 6 from Block 86 to Block 82 can be a regular update (e.g. real time or any relevant time period or in response to a trigger).

Energy consumption varies according to many different drivers and constraints, such as external temperature, expected internal temperature, number of rooms used, number of occupants or visitors, number of dishes served, and other factors. Also, energy consumption is influenced by structural factors such as the age of a building, the size of a building, the location of a building, the temperature inertia of a building, the insulation used, the lighting type, the number of floors of the building, and other structural factors.

In some embodiments, the system will determine generic energy management performance indicators. This is a new way of looking at energy performance: examining how coherently a site or floor (or whatever is being metered) is being managed from an energy perspective. This is very different (and complementary and much more operational) from "benchmarking" a site's performance vs. similar other buildings or processes. The following explanations are one embodiment of this novel approach.

The system implements a self-learning process that uses a learning period to define what is typical behavior of a building in each category (full on, full off, ramp up/down).

The learning period may be set by a user at Block 80, or may be self-calculated based on stability of variations. When mean and standard deviations are fairly stable for each category (even if there are different profiles of days), the system can consider the learning period a success. This may vary between one site and another, as some sites are open 7 days a week, with very similar days (same open hours every day) and very clearly define processes and routines. In these sites, the learning will be fast as variations are reduced to exceptions. Other sites may constantly adapt to specific usages such as a sports center. In this case, a longer time period may be required to define what is relevant. And auto-profiling may be required to group days into more homogeneous groups.

At Block 84, the self-learning process defines typical behavior using energy consumption statistics, for example, typical mean and typical standard deviation for each meter (e.g. for a building, a floor of a building, or another metered region). At Block 86, the system does not compare energy consumption of the metered region to global absolute energy consumption values, but instead to the "normal behavior" that was learned by the method during the learning period.

In addition to the initial self-learning features, the system employs a self-adjusting or self-adapting mechanism that operates during and after the learning time period.

The learning time period can be set by a user, or can be an automatically calculated learning time period to optimize the learning of the system. The duration of the learning time period should be set such that the system learns and adapts as quickly as possible, while at the same time ensuring that there is sufficient consistency in energy consumption during that time period so that the system is observing and learning "normal" energy consumption behavior for that metered region. There is a memory aspect to the process, because it is self-adjusting and self-adapting to keep consistency over time. The self-adjusting mechanism of the process is shown in FIG. 6 where Block 86 loops back to Block 82 in an iterative feedback loop. This loop may be real time (triggered by each new data point received/measured) or at any other relevant time interval. (Examples of possible trigger intervals: Hourly, daily, weekly.)

In another embodiment of the present disclosure, the system automatically defines the number of relevant clusters for each site.

Some meters or sites may exhibit only "on" or "off" energy consumption. For example, this can be the case in a site having a submeter where there is only a single piece of equipment coupled to the submeter. In some sites, the current/power transformer may be of low quality or not adapted for sufficient precision or expected load, so they may provide erroneous energy consumption data.

Some meters may exhibit two meta-categories, with no ramp up/down or approximately no ramp up/down values. Other meters may exhibit three meta-categories, four meta-categories, or more meta-categories.

Data clusters indicate a status of energy usage at a site. For example, a data cluster can indicate a period of time in which energy usage is relatively constant, generally increasing, or generally decreasing. For many meters, a better statistical representation of energy consumption behavior can be achieved either through an increased number of data clusters, or sometimes by only 2 clusters. The discussion herein distinguishes between six groups: a 2—cluster group, a 3—cluster group, a 4—cluster group, a 5—cluster group, a 6—cluster group, and a 7—cluster group.

The optimal number of clusters can be automatically determined by the system, as a parameter globally set in the system, or set site by site. Or this may be a manual parameter set globally or site by site in another embodiment.

3—cluster behavior is common, and is addressed above, in relation to FIG. 3, where there is a "full on" mode, a "full off" mode, and a "ramp up/down" mode.

2—cluster behavior is a simplified version of 3—cluster behavior. It reflects that there are only two modes: "full on" 32 and "full off" 30, without a "ramp up/down" mode, as shown in FIG. 7. An example of this is a large storage building, with no heating/cooling system. Instead, only lights are being turned on or off simultaneously. Thus, the site has only two meaningful operating modes. The clustering and categorization of the energy consumption data at this site reflects this.

The only variation in energy consumption appears at the beginning and end of the "on" or "off" mode intervals, due to the lights being turned on or off earlier than expected or later than expected. This information may not be meaningful in statistical terms, nor in business terms. In this case, according to one of the embodiments of the method of the present disclosure, there are five categories of energy consumption data at a site with only "on" or "off" modes. The first category, Category 1, is all data points below Category 2. Category 2 is the "full off" mode. Category 4 is data points between Category 2 and Category 6. Category 6 is the "full on" mode. Category 7 is data points that are above Category 6. In case of 2—cluster behavior, there is no need for Categories 3 and 5.

Analysis of 4—cluster behavior is similar to analysis of 2—cluster behavior, but it employs Categories 3 and 5. Category 1 is below Category 2. Category 2 is "full off" mode. Category 6 is "full on" mode. Category 7 is above Category 6.

The ramp up/down mode is the category that is above the "full off" category. This is calculated, and depends on the operating modes that are detected. If Category 2 is "shutdown hours," then Category 3 is ramp up/down. If there are two shutdown modes, then Category 3 is the second shutdown mode, and Category 4 is the ramp up/down mode.

In analysis of 5—cluster behavior Category 1 is below the lowest cluster and Category 7 is above the highest cluster. Category 2 is the lowest (first) cluster. Category 3 is the second cluster. Category 4 is the third cluster. Category 5 is the fourth cluster, and Category 6 is the highest cluster.

Analysis of 6—cluster behavior and 7—cluster behavior is similar to the logic of analysis of 4—cluster behavior, with floating ramp up/down meta-category.

The number of categories used could be increased to 8 or 9 categories if needed. For example, there would be a category for each of the clusters, a category for data points above the highest cluster, a category for data points below the lowest cluster, and three categories for data points in each of the three respective gaps between the four clusters.

In another aspect of the present disclosure, the system assigns meaningful meta-categories to the data based on the usage behavior of the site. In one example Category 2 can be the base line "full off" mode, and Category 1 can be below Category 2. In this example, Category 3 is the "ramp up/down" mode, and Categories 4, 5, 6, and 7 correspond to the running hours.

In another embodiment, where the running hours correspond to a "full on" mode, there may be little variation in the running hours. In this example, it may be useful to have Category 6 correspond to "full on," and Category 7 corresponds to data above the "full on" mode. Category 5 would be the "ramp up/down" mode, while Categories 1, 2, 3, and 4 would correspond to the closed hours. This would be particularly useful where there are variations in the closed hour energy consumption, such as where there is a stepwise shutdown process.

In some embodiments, the method of the present disclosure checks the energy usage to see which approach is optimal. Where the process detects that there is a stepwise shutdown process and that there is little variation in the usage during running hours, the process warns the user that this is the case, and/or change the rules of the process to define the categories appropriately.

Figure 8:
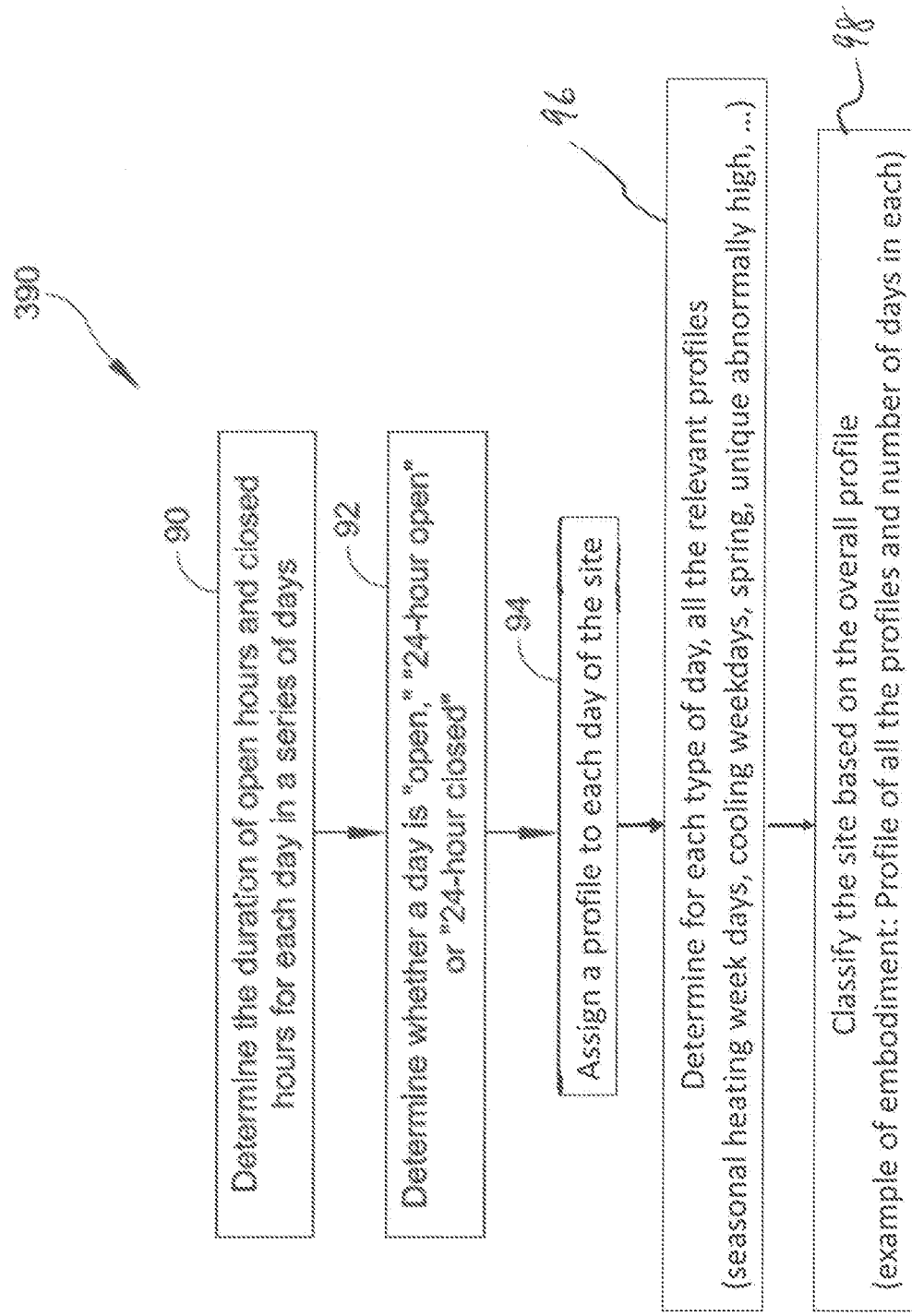
FIG. 8 is a flowchart of another process of an embodiment of a method of the present disclosure.

In another embodiment of the present disclosure, the system uses the meta-categories to define site profiles in the process 390 of FIG. 8. The method determines types of days, and determines the time spent in each of the meta-categories at Block 90 in FIG. 8. The system determines which days are "open," "24-hour open," and "24-hour closed" at block 92. The system determines the duration of open hours per day of a week, the duration of closed hours per day of a week, the duration of ramp up hours per day of a week, and the duration of ramp down hours per day of a week.

Then the system profiles the site, using the daily profiles at Block 94. This can be used for the day classification in Block 64. For example, for a site where all days are identified as being 24-hour open days, the site can be profiled as being a site that is always running.

In Block 96, the system determines, for each type of day, all the relevant profiles (e.g. seasonal heating weekdays, cooling weekdays, spring, unique abnormally high, etc.). In Block 98, the system classifies the site based on the overall profile. For example, the system creates a profile of all of the profiles, and counts the number of days in each profile.

In another embodiment of the present disclosure, the system distinguishes between daily thresholds and a daily mean, and defines real usage per categories and meta-categories.

Thresholds analysis may be useful to identify trends, profiles, or seasonalities. Typical thresholds would be when moving from Category 2 (cat 2) to Category 3 (cat 3) because this is when moving from the Shutdown meta category into the Ramp up and down meta category. Then the system uses the mean of each category and also the mean of each meta-operating mode to look for changes of daily profiles. For example, the system can determine which days have lower average energy consumption during "off" hours.

In another embodiment of the present disclosure, the system uses the meta-categories to define and categorize daily profiles. By using the real usage per meta-category, the system categorizes the days into equivalent profiles, or identifies new profiles to categorize each day. The system can find profiles linked to seasons for "normal open days." For example, a shop can have different profiles for Sundays throughout the year. During the summertime (e.g. between June and August), a shop can be detected open for 10 hours. Between April and the beginning of summer, the same shop may be open only in the morning hours. During the rest of the year, the shop is closed on Sundays.

In another embodiment of the present disclosure, the system automatically detects and names daily profiles. The system identifies recurring behaviors and patterns of energy consumption such as heating or cooling seasonal profile, or such as "single day with abnormal behavior." The system can include data for various spaces, such as a site, a building in a site, a floor in a building, an open space, or a manufacturing space. The system can also include data for different energy consumption types, such as lighting, heating, cooling, machines, IT space, etc. The data can be separated into relevant time periods. The system of the present disclosure provides meaningful energy management signals and profiles. These signals and profiles are useful for modeling energy consumption behavior and interpreting energy consumption behavior as well as for the definition of actionable recommendations. Thus it is possible to use these profiles for enriched analytics. (Examples for illustration purposes, which are not limitative: temperature regression on profiles, daylight changes regression on specific profiles.)

In one embodiment, the system automatically names recurring profiles according to conditions extracted from the energy usage information. For example, in a first profile, there are lower base load energy consumption values between April $10^{th}$ and June $15^{th}$, and longer baseload duration on all days of the week. A second profile corresponds to longer base load duration, which typically occurs on Saturdays and Sundays. A third profile corresponds to the max peak of the period being every Monday, which occurs December $10^{th}$ through March $31^{st}$. Rules can be added to the process to assist with the naming process. For example, rules establish that this first profile occurs between heating and cooling seasons, this second profile occurs over weekend days that are 24-hour closed days, and max peaks (as seen in this third profile) occur during heating period. Feature extraction may be useful to extract meaningful characteristics out of the waveform.

In another embodiment of the present disclosure, the system analyzes the wave form of energy usage data, in addition to the categorization of the data above. It is possible to perform waveform analysis linked to each of the types of days (open days, 24-hour open days, and 24-hour closed days) as well as to the recurring profiles that were detected and named by the system.

The wave form analysis of the energy usage data can be used to identify the number of open-closed "bumps" in the data. For example, in a bank office that is closed between 12:00 h and 14:00 h, everything is shut off between 12:00 h until 13:30 h. The waveform analysis can be used to measure the angles of the "ramp up" and "ramp down" data. If the angle is too flat, there probably are process changes that could save energy in terms of time optimization. The waveform analysis can be used to analyze the number and differentiation of the plateau levels in the usage data. For example, a first heating or cooling step is started early to get to a comfort zone. The system analyzes this data to determine whether this first process step is started too early, and to determine how much money could be saved by starting the first process step later.

FIGS. 9-14 show sample ranking graphics that can be provided to a user through a user interface on an electronic device, such as a computer or mobile device connected to the controller through the network, or provided in a report.

Figure 9:
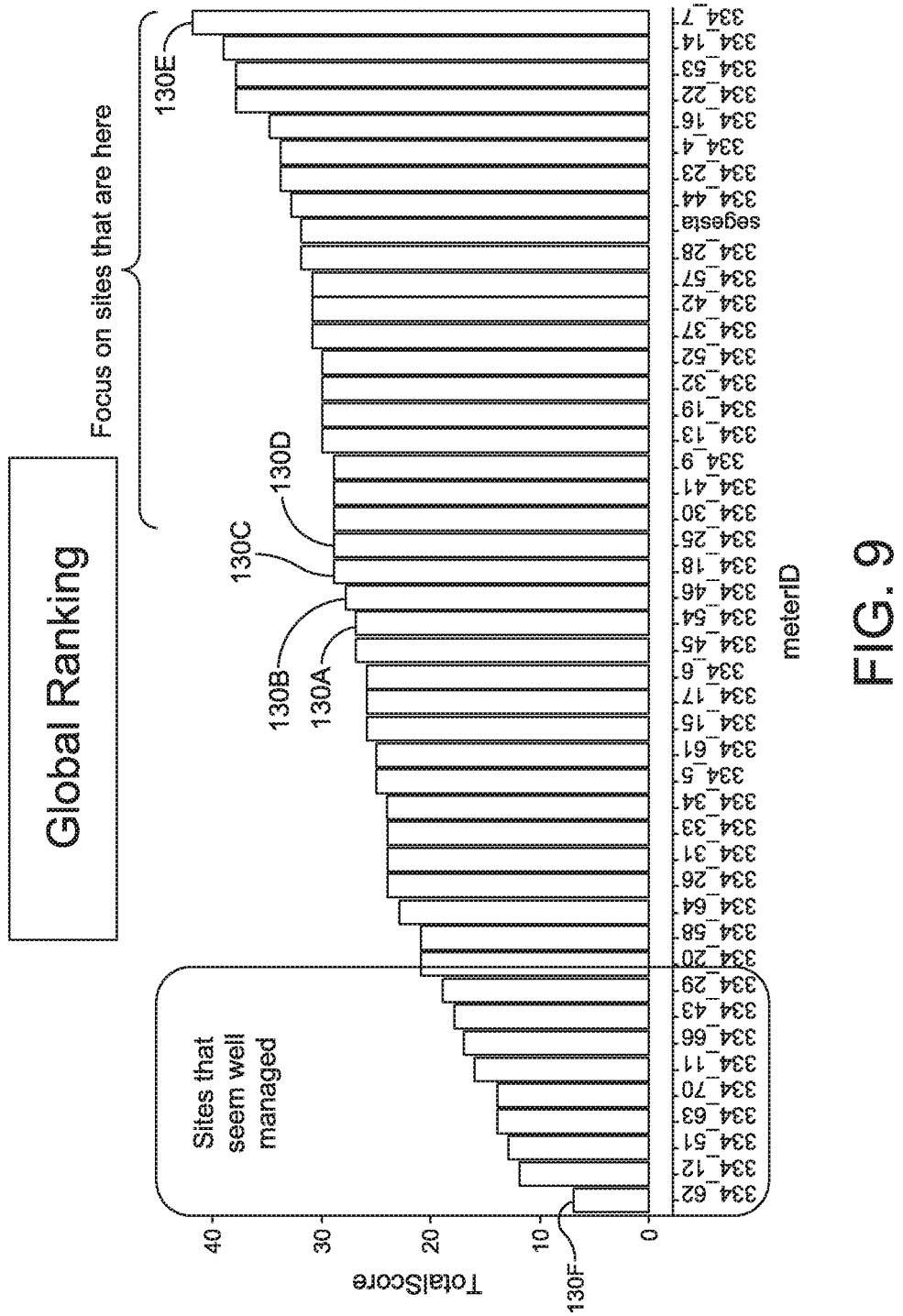
FIGS. 9-14 show sample charts of rankings of meters according to performance metrics.

The method and system of the present disclosure analyze the respective data collected from each meter, rank the meters according to energy management efficiency, and notify a user of the meter ranking. FIG. 9 shows a sample of a ranking of a total score for a set of meters in a site. Each meter has a bar 130A, 130B, 130C . . . that shows its total score. Well managed sites have lower scores, while poorly managed sites have higher scores. A user can quickly view the chart of FIG. 9 and determine which meters need attention with respect to improving energy management efficiency. In FIG. 9, the meter corresponding to the bar 130E has the worst energy management efficiency, while the meter corresponding to the bar 130F has the best energy management efficiency. The total score is based on various metrics that are calculated from the data collected from the meters. The system uses the term energy management efficiency because it indicates how coherent the site is managed, not only how the site performs relative to some more or less similar other sites. Coherence or incoherence, and the type of incoherences give us strong indicators of how well managed the energy is. The system will thus be able to be able to provide valuable observations and/or recommendations: "Abnormal peaks appear frequently during a winter heating period and seem to reflect abnormal behavior when normalized by external temperature changes," or "there is inconsistency between weekdays during shutdown hours durations, especially every second Thursday of the month".

Figure 10:
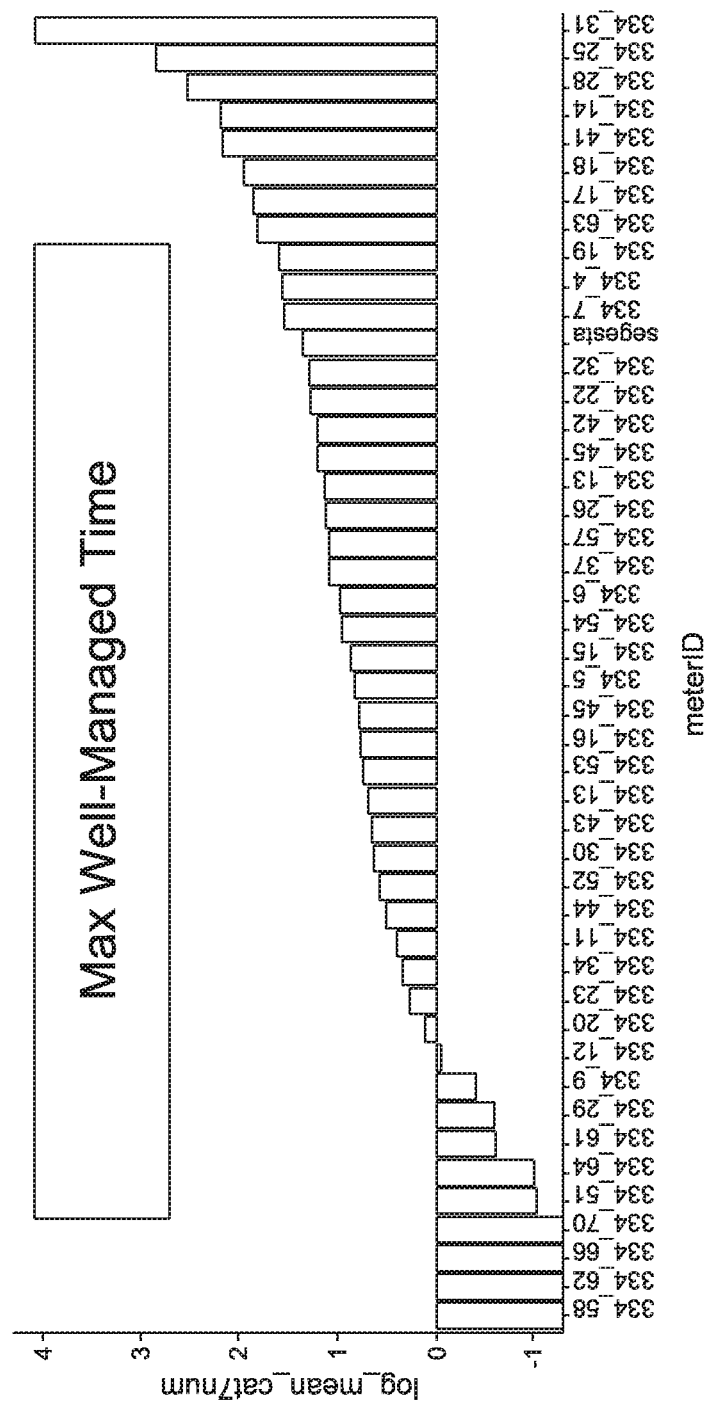
Figure 11:
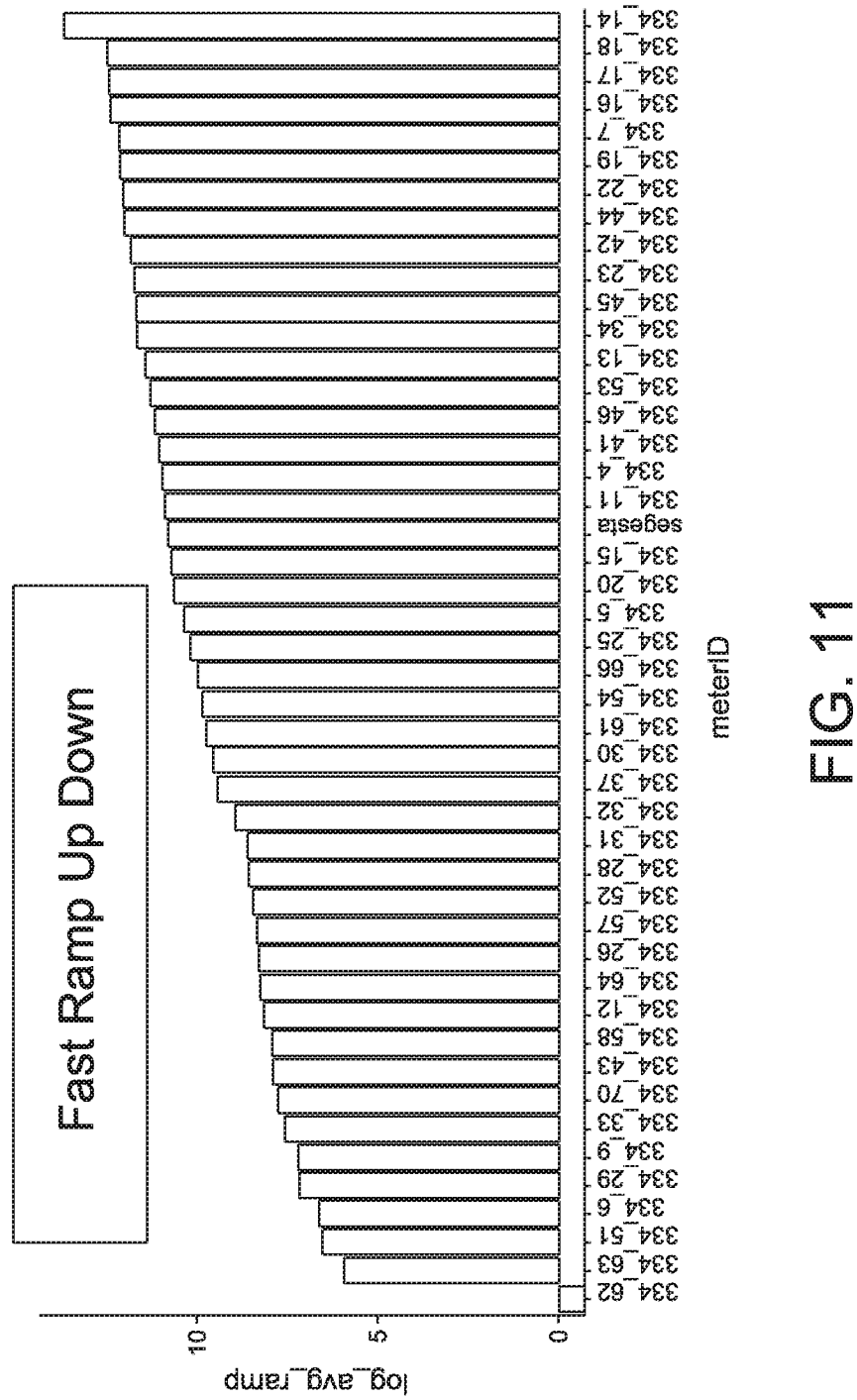
Figure 12:
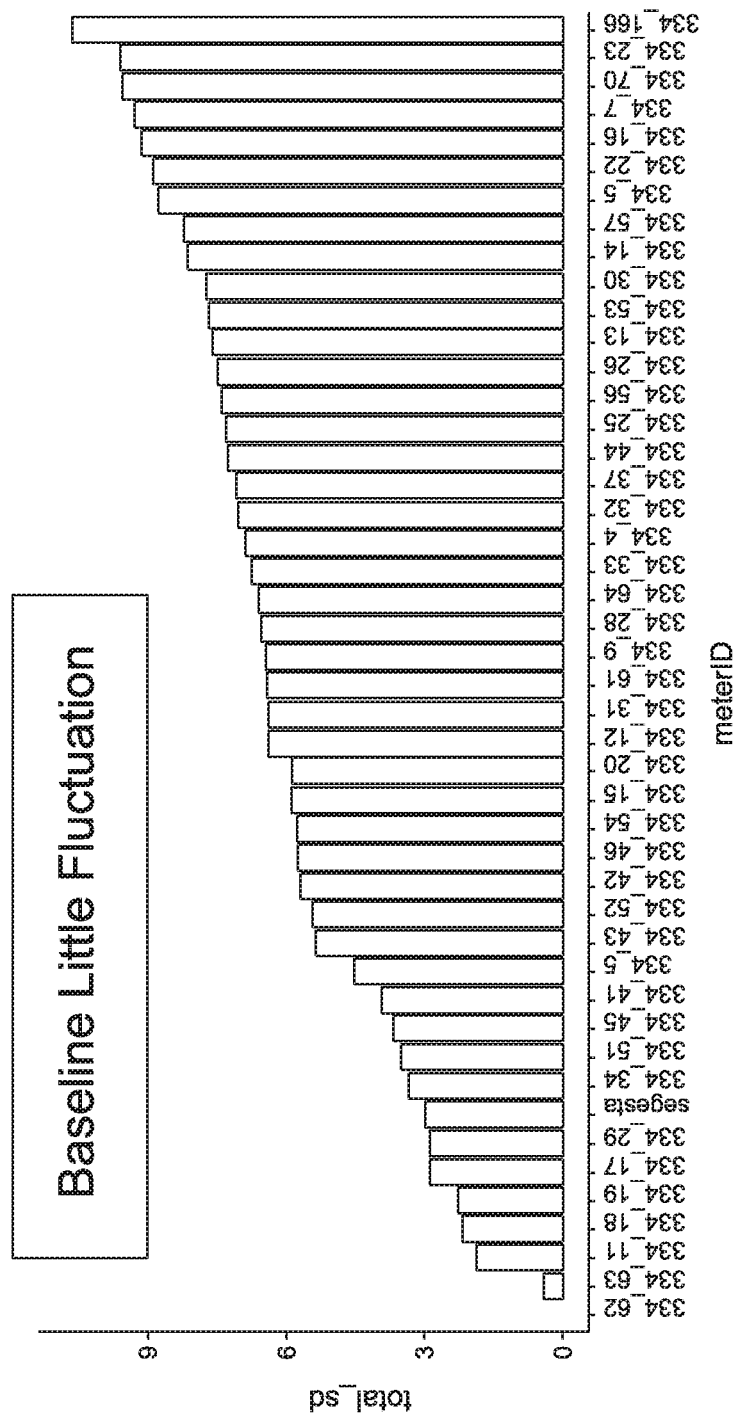
Figure 13:
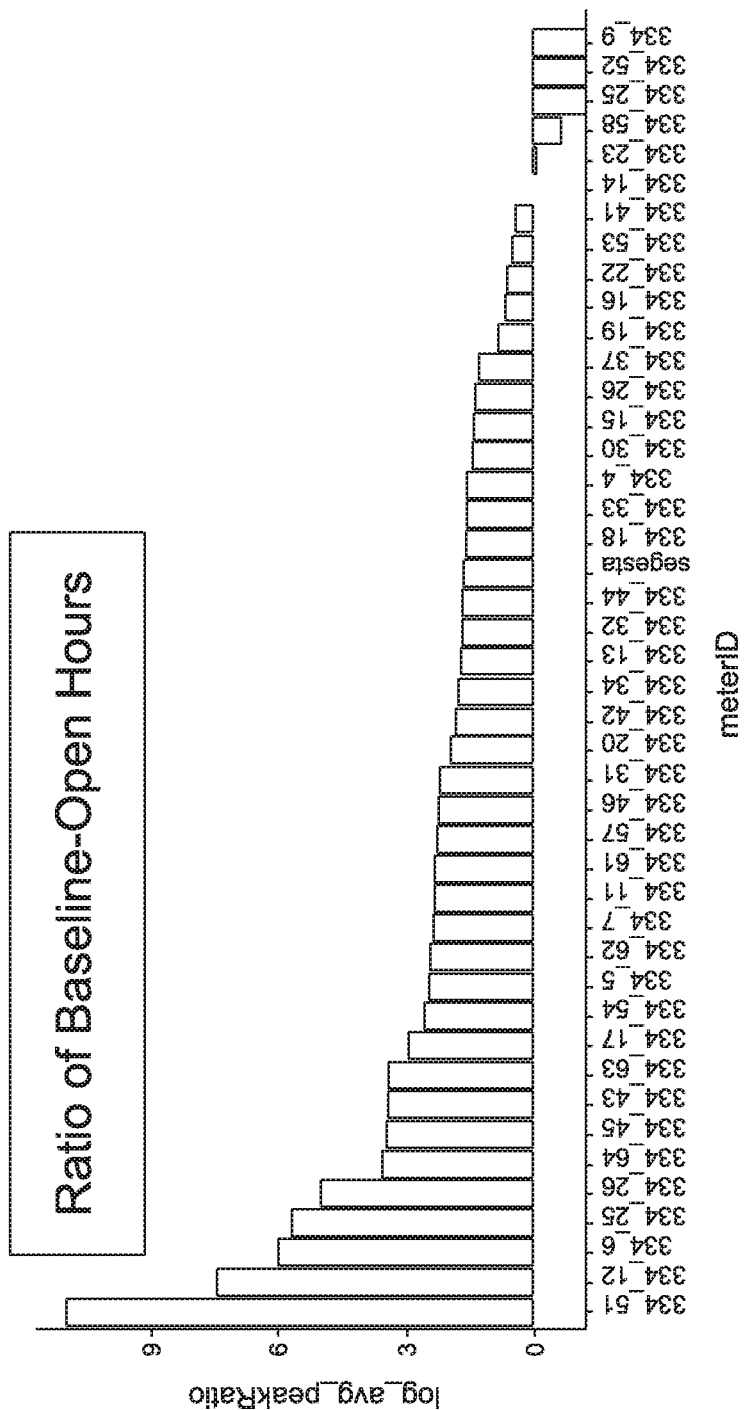
Figure 14:
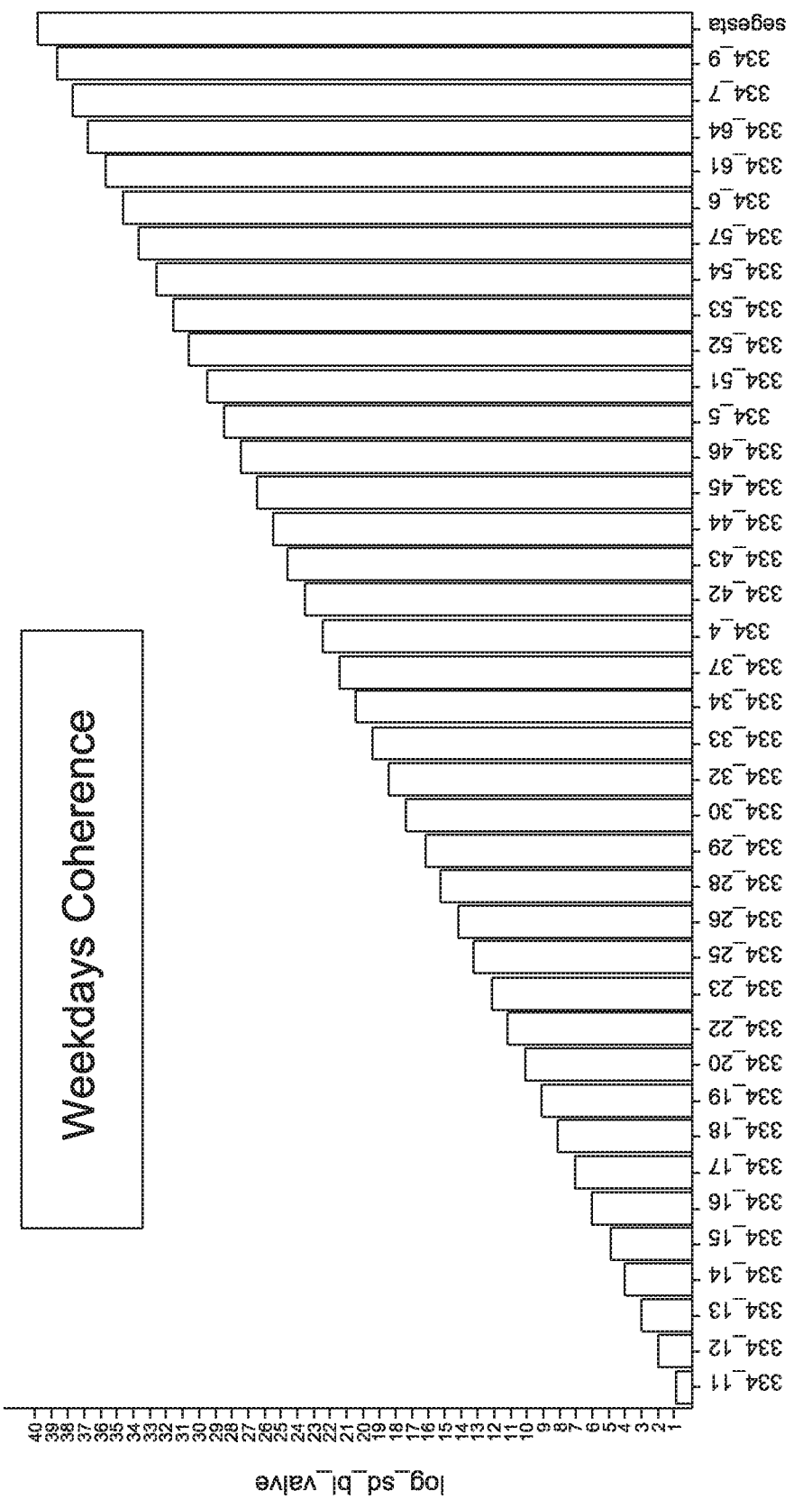

FIGS. 10-14 show various metrics that can be used in the system. In FIG. 10, a chart is used to rank meters based on how well-managed the time is. Meters where the full on period corresponds closely to hours during which the site was scheduled to be open for business are well-managed. Meters for which the full on period extends far into scheduled closed hours are not well-managed. In FIG. 11, meters are ranked based on the slope of their ramp up/down periods. A steep slope in the ramp up/down mode corresponds to a meter where the devices are efficient. FIG. 12 shows a ranking of meters based on base load fluctuation. Meters where the base load has little fluctuation correspond to efficient energy usage. FIG. 13 shows a ranking of meters based on the ratio of their full on energy consumption to their base load energy consumption. Meters that have a high ratio of full on energy usage to base load energy usage correspond to efficient energy usage. FIG. 14 shows a ranking of meters based on consistency of their weekday energy consumption patterns.

To calculate the slope values of FIG. 11, the system in at least one embodiment identifies a data cluster corresponding to energy consumption transitioning between normal running hours and normal closed hours, and calculates a slope of the data cluster using a linear regression or other statistical analysis. The method can notify a user if the slope is below a critical slope. The critical slope is predefined by either the user or by the method to be a slope below which energy usage is inefficient.

To calculate the ratio values for FIG. 13, the system identifies a first data cluster corresponding to normal running hours, then identifies a second data cluster corresponding to normal closed hours, calculates a first mean energy consumption value for the first data cluster and a second mean energy consumption value for the second data cluster, and calculates a ratio of the first mean energy consumption value to the second mean energy consumption value. The first and second data clusters are data clusters for the base load and the full on modes, respectively. The system can provide a notification to a user through the user interface on the electronic device if the ratio of the first mean energy consumption value to the second mean energy consumption value is below a critical ratio value. The critical ratio value is predefined by either the user or by the system to be a ratio above or below which energy usage is inefficient.

In some embodiments these energy management performance indicators may be combined to model the building's behavior (or floor or specific process or specific appliance) and to refine the associated profiles. As an example, it may be connected to a tariff engine to optimize cost reduction. ("Should we start the process earlier because of lower rates 2 hours earlier?").

At least some methods and systems described herein are capable of sending automated alerts and reports to a user, identifying actions the user should take to increase energy efficiency of the energy consumption site, whether the energy consumption site is a facility, a building within a facility, a floor within a building, or another metered region, or any process or any specific appliance.

This detailed description discussion relates to embodiments of the method and system of the present disclosure. Embodiments of the system are configured to carry out the steps of one or more embodiments of the method. Where the steps of an embodiment of a method are discussed, they apply equally to the capabilities of an embodiment of a system.

Generally, the method and system of the present disclosure help in detecting typical deviations from expected building operations. The processes used by the disclosure could be implemented on a meter in a facility, and results of evaluations may be displayed on the meter or sent to a user over a network. The method and system of the present disclosure can be implemented in multiple scenarios, including in the cloud, or a device, or some combination of the two. The method and system can employ a green/yellow/red stoplight evaluation visualization to facilitate notifying a user of actions that can increase energy efficiency. The system of the present disclosure analyzes interval energy data for a facility and automatically assigns clusters of interval data to one of several daily profile elements (such as base load, fully on, fully off, etc.). The presence of a particular set of profile elements within a day are used to classify the facility operating mode during that day (such as open day, 24-hour open day, 24-hour closed day, etc.).

Figure 15:
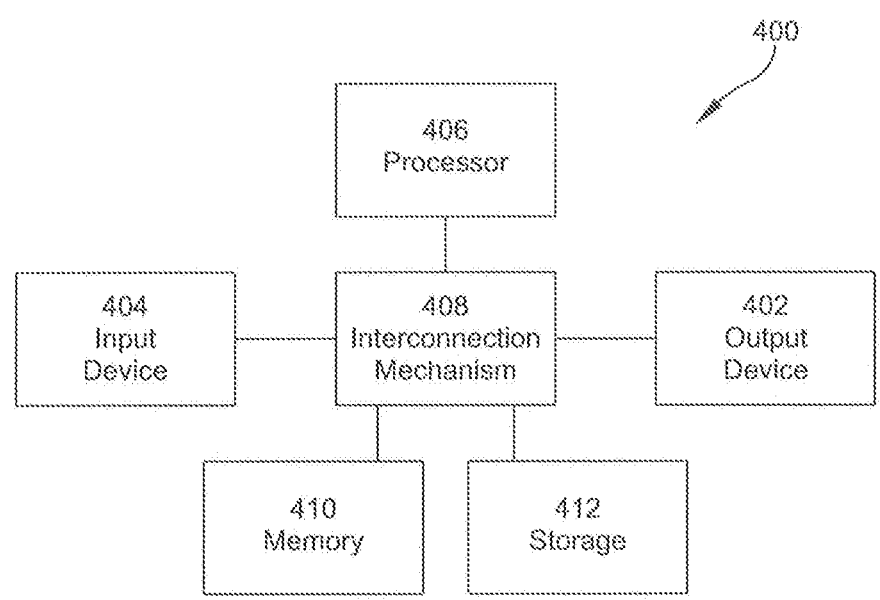
FIG. 15 is a block diagram of a system upon which various embodiments of the disclosure may be implemented.

FIG. 15 illustrates an example block diagram of computing components forming a system 400 which may be configured to implement one or more aspects disclosed herein. For example, the system 400 may be communicatively coupled to the controller 110, included within the controller 110, coupled to the computer (or other electronic device) 120, included within the computer (or other electronic device) 120, coupled to each meter 118A, 118B, 118C, or included within the each meter 118A, 118B, 118C. The system 400 may also be configured to analyze energy consumption, as discussed in more detail above.

The system 400 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 400 may include specially-programmed, special-purpose hardware, for example, an application-specific integrated circuit (ASIC). Various aspects of the present disclosure may be implemented as specialized software executing on the system 400 such as that shown in FIG. 15.

The system 400 may include a processor/ASIC 406 connected to one or more memory devices 410, such as a disk drive, memory, flash memory or other device for storing data. Memory 410 may be used for storing programs and data during operation of the system 400. Components of the computer system 400 may be coupled by an interconnection mechanism 408, which may include one or more buses (e.g., between components that are integrated within a same machine) and/or a network (e.g., between components that reside on separate machines). The interconnection mechanism 408 enables communications (e.g., data, instructions) to be exchanged between components of the system 400. The system 400 also includes one or more input devices 404, which may include for example, a keyboard or a touch screen. The system 400 includes one or more output devices 402, which may include for example a display. In addition, the computer system 400 may contain one or more interfaces (not shown) that may connect the computer system 400 to a communication network, in addition or as an alternative to the interconnection mechanism 408.

The system 400 may include a storage system 412, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 410 that allows for faster access to the information by the processor/ASIC than does the medium. This memory 410 may be a volatile, random access memory such as a dynamic random access memory (DRAM) or static memory (SRAM). It may be located in storage system 412 or in memory system 410. The processor 406 may manipulate the data within the integrated circuit memory 410 and then copy the data to the storage 412 after processing is completed. A variety of mechanisms are known for managing data movement between storage 412 and the integrated circuit memory element 410, and the disclosure is not limited thereto. The disclosure is not limited to a particular memory system 410 or a storage system 412.

The system 400 may include a computer platform that is programmable using a high-level computer programming language. The system 400 may be also implemented using specially programmed, special purpose hardware, e.g. an ASIC. The system 400 may include a processor 406, which may be a commercially available processor such as the well-known Pentium class processor available from the Intel Corporation. Many other processors are available. The processor 406 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In some embodiments, the method and system of the present invention can collect data from a data source other than an energy meter, such as a data file from a computer readable memory component.

In some embodiments, the system can trigger alerts at the main site or meter level. Submeters, which are connected to a single meter can also be used, and each submeter can trigger alerts.

The description of the above methods and systems in relation to "energy" consumption are also intended to cover methods and systems in relation to "power" consumption. Similarly, the description of the above methods and systems in relation to "power" consumption are also intended to cover methods and systems in relation to "energy" consumption.

Embodiments are not limited in their application to the details of construction and the arrangement of components set forth in the following description or illustrated in the drawings. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A method for energy management, the method comprising:
    collecting energy consumption data for a site during a period of time using one or more energy consumption meters;
    identifying data clusters within the energy consumption data, the data clusters indicating a status of energy consumption at the site;
    categorizing the data clusters in the period of time, wherein categorizing the data clusters in the period of time comprises categorizing each data cluster into one of a plurality of categories, wherein the plurality of categories includes a first category related to a full off mode, a second category related to a ramp up/down mode, and at least one category related to running hours of the site;
    assigning one of a plurality of energy consumption classifications to the period of time based on an analysis of the categorized data clusters;
    learning a daily operating mode over a baseline period;
    identifying the period of time as being one of: a normal period of time and an abnormal period of time, with respect to an actual energy consumption during the period of time;
    controlling at least one device to manage the energy consumption in response to an identification of an abnormal period of time; and
    generating a notification based on a change in the energy consumption.

2. The method of claim 1, wherein the change in the energy consumption corresponds to one of: a different stop time within a day, a different start time within a day, and an operating mode on a weekend that is different from an expected operating mode.

3. The method of claim 1, further comprising:
    providing a desired energy usage and a desired classification for the period of time;
    comparing actual usage to the desired energy usage; and
    comparing the energy consumption classification assigned to the period of time with the desired classification.

4. The method of claim 1, further comprising:
    identifying a first data cluster corresponding to normal running hours;
    identifying a second data cluster corresponding to normal closed hours;
    calculating a first mean energy consumption value for the first data cluster and a second mean energy consumption value for the second data cluster; and
    calculating a ratio of the first mean energy consumption value to the second mean energy consumption value.

5. The method of claim 4, further comprising:
    notifying a user if the ratio of the first mean energy consumption value to the second mean energy consumption value is below a critical ratio value.

6. The method of claim 1, further comprising:
    identifying a data cluster corresponding to energy consumption transitioning between normal running hours and normal closed hours;
    calculating a slope of the data cluster; and
    notifying a user if the slope is below a critical slope.

7. The method of claim 1, wherein the energy consumption is managed to improve energy consumption efficiency for the site.

8. The method of claim 1, wherein the one or more energy consumption meters include a plurality of energy consumption meters, and the method further includes:
    ranking the energy consumption meters according to energy management efficiency based on an analysis of the energy consumption data collected by the energy consumption meters; and
    notifying a user of the energy consumption meter ranking.

9. The method of claim 1, wherein the learned daily operating mode is modeled, and the model is dynamically updated in response to the collected energy consumption data.

10. The method of claim 9, wherein the learned daily operating mode is indicative of normal energy consumption for the site.

11. A system for energy management, the system comprising:
    at least one energy consumption meter;
    a controller having a processor and a memory component, the controller being in communication with the at least one energy consumption meter;
    wherein the processor is configured to:
        collect energy consumption data for a site during a period of time using the at least one energy consumption meter;
        identify data clusters within the energy consumption data, the data clusters indicating a status of energy consumption at the site;
        categorize the data clusters in the period of time, wherein categorizing the data clusters in the period of time comprises categorizing each data cluster into one of a plurality of categories, wherein the plurality of categories includes a first category related to a full off mode, a second category related to a ramp up/down mode, and at least one category related to running hours of the site;
        assign one of a plurality of energy consumption classifications to the period of time based on an analysis of the categorized data clusters;
        learn a daily operating mode over a baseline period;
        identify the period of time as being one of: a normal period of time and an abnormal period of time, with respect to an actual energy consumption during the period of time;
        control at least one device to manage the energy consumption in real time in response to an identification of an abnormal period of time; and
        generate a notification based on a change in the energy consumption.

12. The system of claim 11, wherein the change in the energy consumption corresponds to one of: a different stop time within a day, a different start time within a day, and an operating mode on a weekend that is different from an expected operating mode.

13. The system of claim 11, wherein the processor is further configured to:
provide a desired energy usage and a desired classification for the period of time;
compare actual energy usage to the desired energy usage; and
compare the energy consumption classification assigned to the period of time with the desired classification.

14. The system of claim 11, wherein the energy consumption is managed to improve energy consumption efficiency for the site.

15. The system of claim 11, wherein the at least one energy consumption meter includes a plurality of energy consumption meters, and the processor is further configured to:
rank the energy consumption meters according to energy management efficiency based on an analysis of the energy consumption data collected by the energy consumption meters; and
notify a user of the energy consumption meter ranking.

16. The system of claim 11, wherein the learned daily operating mode is modeled, and the model is dynamically updated in response to the collected energy consumption data.

17. The system of claim 16, wherein the learned daily operating mode is indicative of normal energy consumption for the site.

18. A method for energy management, the method comprising:
collecting energy consumption data for a site during a period of time using one or more energy consumption meters;
identifying data clusters within the energy consumption data, the data clusters indicating a status of energy consumption at the site;
categorizing the data clusters in the period of time, wherein categorizing the data clusters in the period of time comprises categorizing each data cluster into one of a plurality of categories, wherein the plurality of categories includes a first category related to a full off mode, a second category related to a ramp up/down mode, and at least one category related to running hours of the site;
assigning one of a plurality of energy consumption classifications to the period of time based on an analysis of the categorized data clusters;
identifying the period of time as being one of: a normal period of time and an abnormal period of time, with respect to an actual energy consumption during the period of time; and
controlling at least one device to manage the energy consumption in response to an identification of an abnormal period of time, the method further comprising:
determining optimal energy consumption behavior for the site;
detecting a change in energy consumption; and
comparing an actual energy consumption after the change in energy consumption with at least one of: an alert level and the optimal energy consumption behavior.

19. The method of claim 18, further comprising providing recommendations to a user to improve energy usage efficiency.

20. The method of claim 18, further comprising at least one of:
checking whether a temperature set point has been changed, and
checking performance of an HVAC unit,
in response to detecting higher energy consumption during open hours of the site.

* * * * *